United States Patent

Imoto et al.

[11] Patent Number: 5,423,630
[45] Date of Patent: Jun. 13, 1995

[54] METHOD AND APPARATUS FOR REPAIRING A PIPELINE

[75] Inventors: Takayoshi Imoto, Otsu; Shinichi Takebe, Suita, both of Japan

[73] Assignee: Ashimori Industry Co., Ltd., Osaka, Japan

[21] Appl. No.: 43,727

[22] Filed: Apr. 6, 1993

[30] Foreign Application Priority Data

Apr. 7, 1992 [JP] Japan .................................. 4-115361

[51] Int. Cl.⁶ .............................................. F16L 55/18
[52] U.S. Cl. ...................................... 405/154; 138/97; 405/156; 405/157
[58] Field of Search ............... 405/150.1, 154, 156, 405/157; 138/97

[56] References Cited

U.S. PATENT DOCUMENTS

| | | | |
|---|---|---|---|
| 4,897,911 | 2/1990 | Keldany et al. | 405/150.1 X |
| 5,049,003 | 9/1991 | Barton | 405/154 |

FOREIGN PATENT DOCUMENTS

| | | |
|---|---|---|
| 0454309 | 10/1991 | European Pat. Off. . |
| 4021456 | 3/1991 | Germany . |
| 63-186744 | 8/1988 | Japan . |
| 63-194929 | 12/1988 | Japan . |
| 1363380 | 8/1974 | United Kingdom . |
| 2172370 | 9/1986 | United Kingdom . |

*Primary Examiner*—David H. Corbin
*Attorney, Agent, or Firm*—Birch, Stewart, Kolasch & Birch

[57] ABSTRACT

A tubular structure (21) composed mainly of a sheet material (22) formed from a thickened solution of an ultraviolet-curing resin in which high-strength fibers are dispersed, is inserted into a pipeline (7) so as to face a damaged part (26) thereof, is expanded into intimate contact with the inner surface of the pipeline (7), and is irradiated with ultraviolet light on its inner surface, whereby the resin is cured. Sealing members (24, 24') capable of swelling with water are fitted about the opposite end portions of the tubular structure (21) so that the sealing members (24, 24') may be located on the opposite sides of the damaged part (26) of the pipeline (7) from each other.

16 Claims, 3 Drawing Sheets

METHOD AND APPARATUS FOR REPAIRING A PIPELINE

This invention relates to a method, apparatus, and material for repairing mainly an underground pipeline, such as a sewer.

BACKGROUND OF THE INVENTION

When an underground pipeline has a damaged part or joint through which a fluid leaks out from the pipeline or underground water leaks into it, it desirable to repair the damaged part or joint to prevent such leakage.

When repairing such a pipeline, it has been usual to repair a long pipeline as a whole by inserting a tubular lining material into the pipeline and hardening the lining material along the inner surface of the pipeline.

Methods for repairing a sewer pipe, for example, involve applying lengthy tubular sheet material, which is prepared from a thickened solution of a curable resin in which high-strength fibers are dispersed, onto the inner surface of the pipeline, bring it into intimate contact with the inner surface of the pipeline and heating it to cure the resin in the sheet material. (see EP-A-454309).

If a long pipeline is only partly damaged, however, it is undesirable from an economical standpoint to line the whole pipeline and it is desirable to repair only its damaged part.

The lining of only a part of a pipeline, such as a damaged part, however, presents different problems from those arising from the lining of the whole pipeline along its entire length.

For example, when lining a sewer pipe by a method as described above, a rigid pipe formed in the pipeline to line it does not necessarily adhere closely to the inner surface of the pipeline. Instead, there is a good likelihood that a clearance may be left between the outer surface of the pipe and the inner surface of the pipeline which will allow the passage of underground water entering the pipeline through its damaged part.

If the pipeline is lined along its whole length, the underground water which has entered the clearance is required to flow a very long distance before leaving it to enter the pipeline, the amount of water entering the pipeline being, therefore, negligible. If the pipeline is only partly lined, however, the distances between its damaged part and the ends of the lining pipe are too short to prevent a large amount of underground water from entering the pipeline and flowing into sewage.

Another problem is that there are not a few cases where the work for lining a pipeline has to be done in the presence of a large amount of underground water which has entered it through its damaged part. Therefore, it is very likely that water may hinder the curing reaction of the resin, or that the cooling action of water may delay the effective heating of the resin and its curing.

Under these circumstances, it is an object of this invention to enable the repairing of a pipeline, such as a sewer, which is limited to a damaged part thereof and, independently, to prevent underground water more effectively from entering the pipeline through its damaged part and past a comparatively short repair pipe section.

SUMMARY OF THE INVENTION

According to a first aspect of this invention, there is provided a method of repairing a pipeline which comprises inserting a roll of a sheet-like material including a thickened solution of an ultraviolet-curing resin in which high-strength fibers are dispersed, and having a pair of longitudinal edge portions slidably overlapping each other, into a damaged part of the pipeline, causing its overlapping portions to slide on each other to expand the tubular sheetlike material and bring it into intimate contact with the inner surface of the pipeline, and irradiating the tubular sheetlike material with ultraviolet light from an ultraviolet lamp within the pipeline to cure the resin.

According to a second aspect of this invention, there is provided a method of repairing a pipeline which comprises inserting a roll of a sheet material including a thickened solution of a curable resin in which high-strength fibers are dispersed and having a pair of longitudinal edge portions slidably overlapping each other and having sealing members capable of swelling with water on the outer surface of the tubular sheetlike material, at least adjacent to each end thereof, into a damaged part of the pipeline, causing its overlapping portions to slide on each other to expand the tubular sheetlike material and bring it into intimate contact with the inner surface of the pipeline, with the sealing members sandwiched between the outer surface of the tubular sheetlike material and the inner surface of the pipeline so that at least one sealing material is located on each longitudinal side of the damaged part of the pipeline and then curing the resin.

This invention also provides an apparatus which is used for carrying out the method according to the first aspect of this invention, and which comprises a tubular member transmissive of ultraviolet light, supporting members attached to both ends of the tubular member for supporting it against the inner surface of a pipeline, while being movable along the pipeline, mounts for a repairing assembly which are provided around both ends of the tubular member for mounting both ends of the repairing assembly fitted around the tubular member, pressurizing means for supplying a pressurized fluid into the space between the tubular member and the mounts and an ultraviolet lamp positioned within the tubular member. There is preferably also a cooling fan for supplying air into the tubular member to cool the ultraviolet lamp.

This invention also provides a repairing assembly which may be employed in the apparatus as defined above for lining a pipeline by the method according to the first aspect of this invention, and which assembly comprises a flexible and inflatable tube transmissive of ultraviolet light, the tubular sheetlike material surrounding the inflatable tube, the repairing assembly being enclosed in a bag opaque to ultraviolet light prior to use.

The repairing assembly may further include annular sealing members fitted to the outer surface of the tubular sheetlike material in spaced apart relationship adjacent to each end thereof, the sealing members being of a material which swells by absorbing water, so that it may also be employed for carrying out the method according to the second aspect of this invention.

BRIEF DESCRIPTION OF THE DRAWINGS

Embodiments of the different aspects of the invention will now be described with reference to drawing wherein.

DETAILED DESCRIPTION OF THE INVENTION

Figure 1:
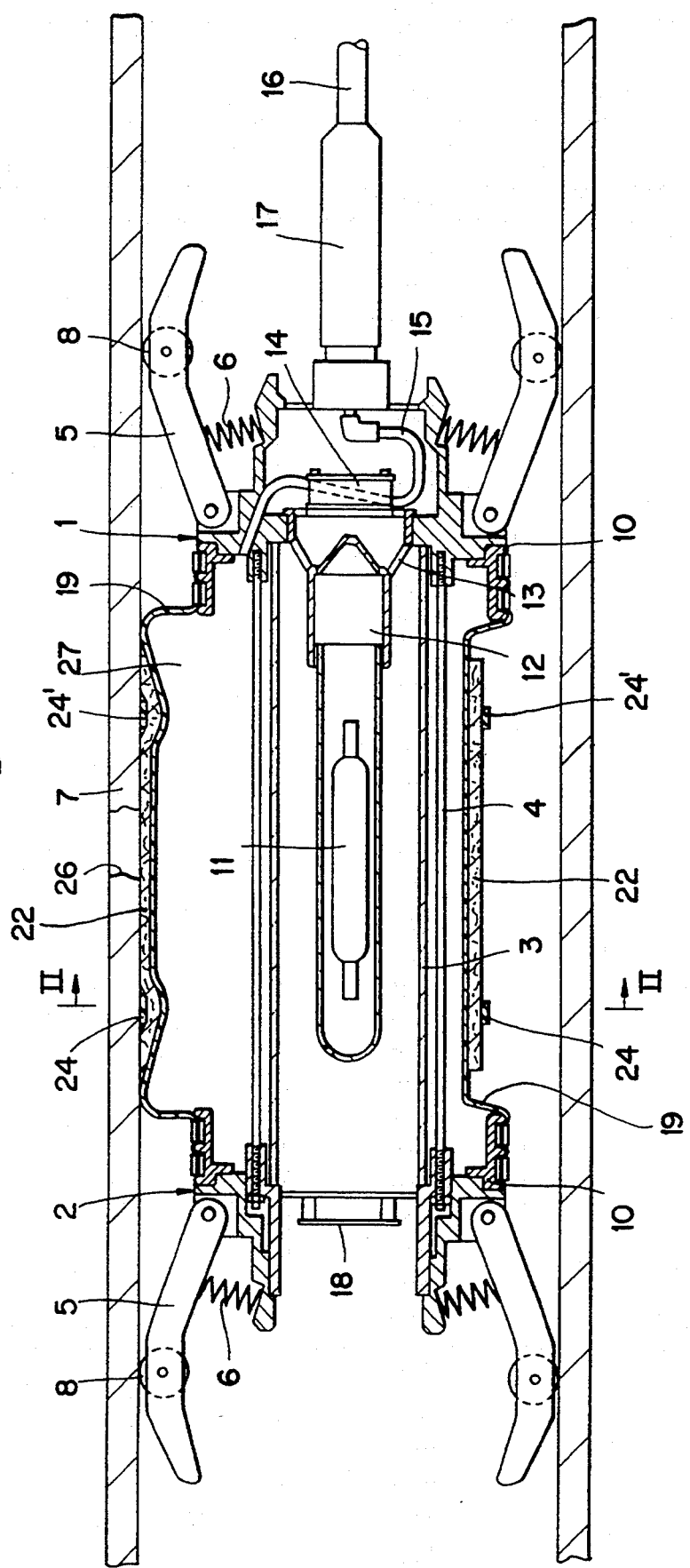
FIG. 1 shows a diametrical sectional view of an apparatus embodying this invention with repair assembly shown in two different positions.
Figure 2A:
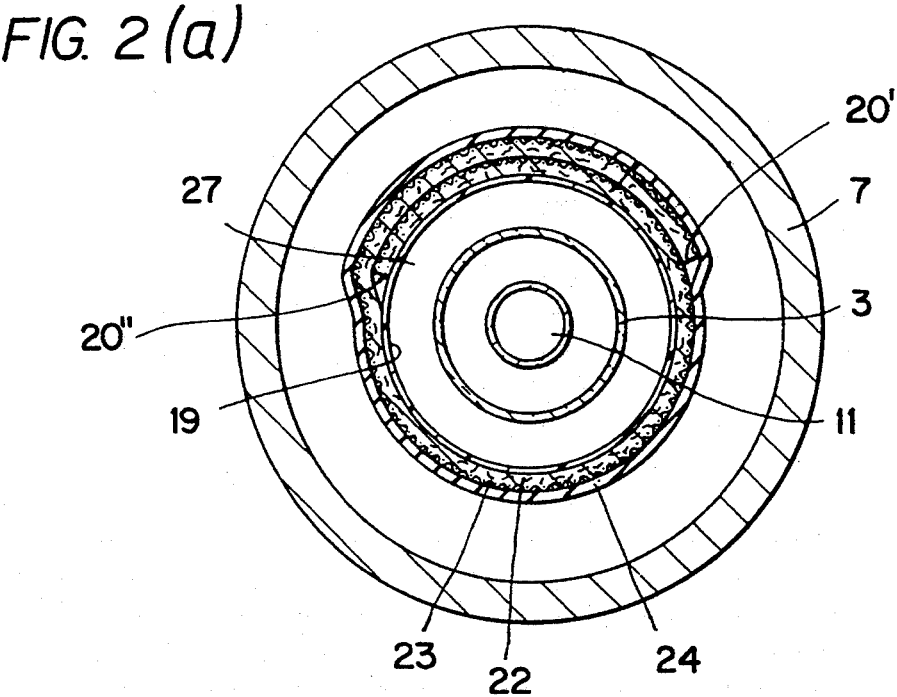
FIG. 2 consists of FIG. 2 (a) and FIG. 2 (b) which are sectional views taken along the line II—II of FIG. 1, with FIG. 2 (a) showing the apparatus as positioned in a pipeline, and FIG. 2 (b) showing an expanded repairing assembly, respectively.
Figure 2B:
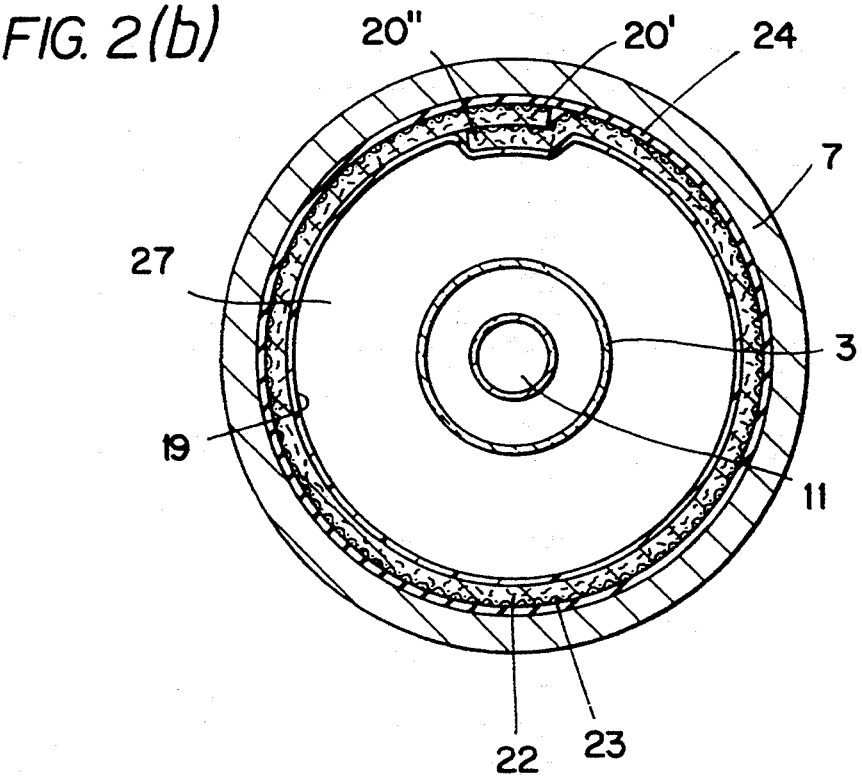

FIG. 1 shows an apparatus embodying this invention which includes supporting members 1 and 2, and a tubular member 3 formed of a material being able to transmit ultraviolet light therethrough, such as quartz glass, and interposed between the supporting members 1 and 2. The supporting members 1 and 2 are connected to each other by connecting rods 4.

In connection with the tubular member 3, any tubular wire netting layer may be located over the outer surface of the tubular member 3. The usefulness of the tubular wire netting layer is described later.

Each of the supporting members 1 and 2 is provided with a plurality of pivotally-mounted legs 5 which are urged by spring means 6 outwardly toward an open position, and each leg 5 is provided with a roller 8 for contacting the inner surface of a pipeline 7.

Each supporting member 1 or 2 is provided with an annular mount 10 for repairing assembly 9 which will hereinafter be described.

The rear supporting member 1 is provided with a socket 12 for an ultraviolet lamp 11 positioned within the tubular member 3.

The supporting member 1 has a through hole 13 in its portion to which the socket 12 is attached, and a fan 14 is installed behind the socket 12 for supplying air into the tubular member 3 through the hole 13 to cool the ultraviolet lamp 11.

An air supply pipe 15 is employed as pressurizing means for supplying compressed air into the space between the tubular member 3 and the mount 10 for the repairing material, through the supporting member 1.

A cable 16 is attached to the rear supporting member 1 by a connector 17, and holds the air supply pipe 15 and an electric wire for supplying electricity to the ultraviolet lamp 11 and the cooling fan 14, its other end being located outside the pipeline 7.

The front supporting member 2 has a cover 18 for preventing water, etc. from entering the tubular member 3.

The repairing assembly 9, which is tubular, is fitted about the tubular member 3 and has its opposite ends fastened to the mounts 10 on the supporting members 1 and 2, respectively, as shown in FIG. 1. FIG. 1 shows that the repairing assembly 9 is fitted to the apparatus and that the sealed inflatable tube 19 of the repairing assembly 9 is inflated by compressed air supplied into the space 27 formed between the tubular member 3 and the inflatable tube 19.

Figure 3:
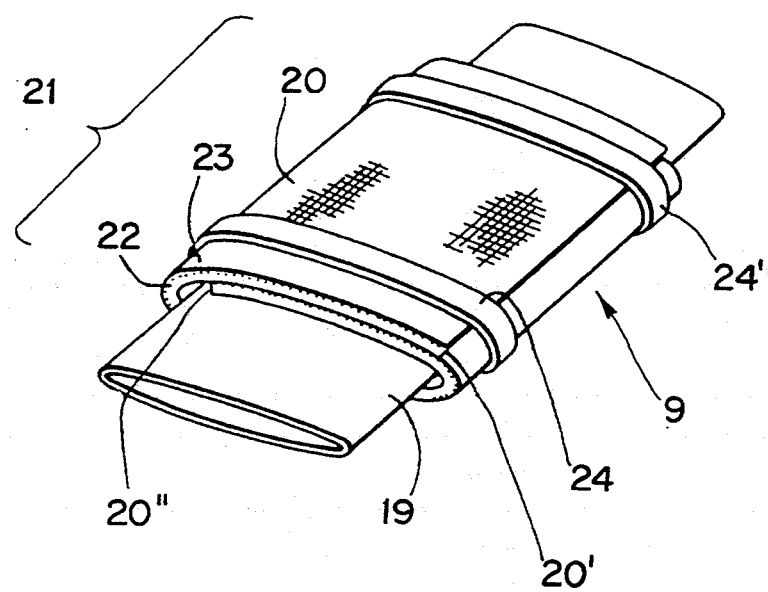
FIG. 3 shows a perspective view of repairing assembly embodying this invention.

The repairing assembly 9 is shown in detail in FIG. 3. It comprises a flexible and inflatable tube 19 formed from a plastics material transmissive of ultraviolet light.

A sheetlike material 20 is rolled around the inflatable tube 19 and forms a tubular structure 21. The sheetlike material 20 is composed mainly of a sheet material 22 formed from a thickened solution of an ultraviolet-curing resin in which high-strength fibers are dispersed. On the inner and/or outer surface of the sheet material 22, a thin meshed woven fabric 23 is overlapped. In FIG. 3, a thin meshed woven fabric 23 bonded to the outer surface of the sheet material 22 and forming an integral part thereof, is shown.

This arrangement is, however, not intended to limit the scope of this invention. This invention include the use of a woven fabric of a synthetic fiber, such as polyester fiber, or glass fibers, as woven fabric 23. Moreover, the woven fabric 23 need not necessarily be provided on the outer surface of the sheet material 22, but can alternatively be located on the inner surface of the sheet material 22, or between its inner and outer surfaces.

The sheetlike material 20 may consist solely of the sheet material 22, but as the sheet material is formed merely from a thickened resin solution containing fibers dispersed therein, it is so low in strength before curing that the tubular structure 21 is likely to be excessively partially stretched, or broken when it is diametrically expanded. Therefore, the sheetlike material 20 is preferably reinforced by glass fibers as the woven fabric 23.

The sheetlike material 20 has a width which is somewhat larger than the inner peripheral length of the pipeline 7, and the tubular structure 21 formed by winding it about the inflatable tube 19 has a pair of longitudinal edge portions 20', 20" slidably overlapping each other.

The inflatable tube 19 has a pair of ends projecting from the ends, respectively, of the tubular structure 21.

Annular sealing members 24, 24' are fitted about the tubular structure 21 adjacent to its ends, respectively.

The sealing members are formed from a material which swells and increases its volume drastically by absorbing water, and generates pressure if its deformation is restrained by an external force. An appropriate material can be selected from among a variety of commercially available rubber materials having the property of swelling or expanding with water. As an example of the rubber materials, "AQUAQUELL SEALER-W5V" manufactured by OHJI RUBBER & CHEMICALS Co., Ltd. is taken, which is able to be swelled up to 500% with water in ten hours. It will normally be pre-cured; that is, not one intended to be cured by the action of the ultraviolet lamp.

Examples of the known materials for the annular sealing members 24, 24' comprise crystalline diene rubbers and resins having a high water absorbency. Examples of the crystalline diene rubbers are the blends of chloroprene rubber and rubbers obtained by the random copolymerization of styrene and dienes. Examples of the resins having a high power of absorbing water include crosslinked polyacrylates, crosslinked salts of copolymers of isobutylene and maleic anhydride, and crosslinked salts of copolymers of polyvinyl alcohol and acrylic acid. Typical swelling times are in the order of 10 hours and the materials may have a swelling capacity of up to 500%.

The repairing assembly 9 is enclosed in a bag 25 opaque to ultraviolet light, until it is used for lining work.

A method for repairing a damaged part 26 of the pipeline 7 with the repairing assembly 9 employing the apparatus as hereinabove described, is described hereinbelow.

The repairing assembly 9 is removed from the bag 25, and put on about the tubular member 3, and the opposite ends of the inflatable tube 19 of the repairing assembly 9 are fitted about the mounts 10 on the supporting members 1 and 2, respectively, and fastened thereto in a gastight fashion to form a gastight closed space between the tubular member 3 and the inflatable tube 19.

It is alternatively possible within the scope of this invention to put, previously, the inflatable tube 19 on about the tubular member 3, fit the opposite ends of the inflatable tube 19 about the mounts 10 on the supporting members 1 and 2, fasten them to the mounts 10 in a gastight fashion, and then wind the sheetlike material 20 about the inflatable tube 19.

The inflatable tube 19 is formed of any plastic material transmissive of ultraviolet light. The outer peripheral length of the inflatable tube 19 may be somewhat smaller than the inner peripheral length of the pipeline 7. Each of the ends of the inflatable tube 19 is fitted about the mounts 10, 10' in a gastight fashion. When fitting the end of the inflatable tube 19 to the mount 10, the end may be, preferably, gathered in the round periphery to be sealed.

In one embodiment of the method of the present invention, in the first stage, both ends of the inflatable tube 19 are fitted to the mounts 10, 10', respectively, to seal in gastight fashion and then, at the second stage, a pressurized fluid, such as compressed air, is supplied into the sealed space 27 formed by the tubular member 3 and the inflatable tube 19 through the air supply pipe 15 to inflate the tube 19 sealed at both ends thereof. In the next stage, the tubular sheetlike material 20 is wound about the inflated tube 19. Then, the fluid in the sealed space 27 is drawn off to deflate the inflated tube 19. After the deflation, the loose parts of the tube 19 and the sheetlike material 20 are folded up around the tubular member 3.

Then, the apparatus, being equipped with the inflatable tube 19 and the sheetlike material 20, is inserted into the pipeline 7 through one end thereof, and moved along the pipeline 7 by, e.g., a cable pulling the apparatus toward the other end of the pipeline.

The legs 5 are urged outwardly of the supporting members 1 and 2 and remain in contact with the inner surface of the pipeline 7 to hold the apparatus substantially in the center of cross-section of the pipeline 7, while allowing the apparatus to move along the pipeline 7, as the rollers 8 roll on its inner surface.

When the rollers 8 reach the damaged part 26, the irregular matter of the damaged part is detected by any mean for propagation, such as TV camera or any type of sensor. Then, the movement of the apparatus is stopped and the apparatus is located so that the damaged part 26 can be located at nearly the central part of the apparatus.

Thus, when the apparatus has arrived at the damaged part 26 of the pipeline 7, it is so positioned that the damaged part 26 may be situated between the sealing members 24, 24' on the repairing assembly 9. (see FIG. 1).

Then, a pressurized fluid, such as compressed air, is supplied from a source of supply outside the pipeline 7 into the sealed space 27 formed between the tubular member 3 and the inflatable tube 19 through the cable 16 and the air supply pipe 15.

The resulting increase in internal pressure of the inflatable tube 19 inflates it, and thereby expands the tubular structure 21 wound about it, as the overlapping portions of the sheetlike material 20 slide on each other, while the sealing members 24, 24' fitted about the tubular structure 21 are also diametrically expanded.

The tubular structure 21 is brought into intimate contact with the inner surface of the pipeline 7, while the sealing members 24, 24' are held between the outer surface of the tubular structure 21 and the inner surface of the pipeline 7 on opposite sides of the damaged part 26 from each other. (see FIG. 1).

The ultraviolet lamp 11 is supplied with an electric current to emit ultraviolet light for irradiating the sheetlike material 20 through the tubular member 3 and the inflatable tube 19 to cure the ultraviolet-curing resin in the sheet material 22.

The fan 14 is placed in operation for supplying fluid, e.g. air into the tubular member 3 to cool the ultraviolet lamp 11 heated by the emission of ultraviolet light and thereby protect the inflatable tube 19 and the tubular structure 21 from being overheated.

When the tubular structure 21 has been fully hardened, the supply of electric current to the ultraviolet lamp 11 is discontinued and the fluid in the sealed space 27 is drawn off so that a reduced pressure can be created in the space 27 to allow the detachment of the inflated tube 19 from the inner surface of the hardened tubular structure 21.

As aforesaid, any tubular wire netting layer may be, previously, located over the outer surface of the tubular member 3. The tubular wire netting layer is useful to prevent direct contact of the inflatable tube 19 with the outer surface of the tubular member 3 which may occur when the inflated tube 19 deflates by the reduced pressure in the sealed space 27. If some parts of the tube 19 touch directly with the outer surface of the tubular member 3 to adhere thereto by the remaining heat therein, it is possible to tear off the adhered parts of the tube 19 from the tubular member 3 by supplying a pressurized fluid into the space 27 because of the presence of the wire netting layer.

After the repairing operation according to the method of the present invention, the apparatus is removed from the pipeline 7.

The damaged part of the pipeline 7 is, thus, repaired with the repairing material 9 which prevents the leakage of a fluid from the pipeline and of underground water thereinto.

If the damaged part 26 of the pipeline 7 is a missing part of its wall, it is likely that the sheetlike material 20 may expand into the missing part to the extent that its overlapping portions form an opening therebetween. It is, therefore, desirable to place about the sheetlike material 20 in a tubular fabric or net which is not undesirably expanded by the internal pressure, but can hold the sheetlike material 20 against any undesirable expansion resulting in its overlapping portions forming an opening therebetween.

The method according to the first aspect of this invention relies upon ultraviolet light for curing the sheetlike material 20, instead of heating it, and can, therefore, cure it rapidly. Moreover, it ensures the efficient curing of the ultraviolet-curing resin, even if underground water may enter the damaged part 26, since the resin employed does not have its curing reaction hindered by water.

There is known a method of lining the whole of a long pipeline which employs ultraviolet light for curing a resin as a lining material. This method, however, requires a very long time for a lining job, since it is necessary to move an ultraviolet lamp very slowly along the lining material held against the inner surface of the pipeline.

It is, therefore, much lower in efficiency than a lining method which employs heating, e.g. steam heating for curing, as far as the lining of a long pipeline is concerned. If the pipeline is to be partly repaired, as contemplated by this invention, however, it is possible to accomplish its repair very quickly and efficiently, since it is sufficient to apply ultraviolet light to the lining material positioned near the part to be repaired.

The method according to the second aspect of this invention employs the sealing members 24, 24' interposed between the outer surface of the pipeline 7 adjacent to the opposite ends of the repairing assembly 9. In the event that underground water enters the clearance between the tubular structure 21 and the pipeline 7 through the damaged part 26, it is absorbed by the sealing members 24, 24' and swells them.

The swollen sealing members 24, 24' have softened surfaces making intimate contact with the surfaces of the tubular structure 21 and the pipeline 7, and are restrained against deformation by the cured tubular structure 21 and the pipeline 7, resulting in the generation of pressure which forces the sealing members 24, 24' against the tubular structure 21 and the pipeline 7.

Thus, the swollen sealing members 24, 24' form a seal between the tubular structure 21 and the pipeline 7 against any further leakage of underground water, and maintain their sealing actions without being collapsed by the pressure of underground water.

The method according to the second aspect of this invention also enables the use of a thermosetting resin for forming the sheet material 22. Although the water leaking in through the damaged part 26 may hinder the curing of a thermosetting resin in the surface of the tubular structure 21, it is possible to achieve a satisfactory repairing job even if the surface of the tubular sheetlike material is not satisfactorily cured, since most of the tubular structure 21 is completely cured and has a sufficiently high strength, and the swollen sealing members 24, 24' shut off water from entering the pipeline.

While it is necessary to fit the sealing members 24, 24' about the tubular structure 21 at least adjacent to the opposite ends thereof, it is possible to employ a sealing member or members 24, 24' covering the whole surface of the tubular structure 21. The sealing member or members 24, 24' are interposed between the whole inner surface of the repaired part of the pipeline 7 and the whole outer surface of the tubular structure 21, and exhibits a sealing action by absorbing water along the whole length of the repairing assembly.

It is preferable to combine the methods according to the first and second aspects of this invention by using an ultraviolet-curing resin for the sheet material 22, and fitting the sealing members 24, 24' about the tubular structure 21, as stated above in the description of the embodiments.

This invention makes it possible to repair a damaged part of a long pipeline, such as a sewer pipe, without lining the pipeline along its whole length, and thereby shut off underground water effectively from entering the pipeline through its damaged part.

Even if underground water may be flowing into the pipeline through its damaged part during the work for repairing, it is possible to repair the damaged part 26 and shut off underground water from flowing into the pipeline, since the method according to the first aspect of this invention employs the ultraviolet-curing resin which is curable even in the presence of water, and the method according to the second aspect thereof employs the sealing members 24, 24' which swell with water.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method of repairing a damaged part of a pipeline which comprises the steps of
    inserting a repairing apparatus into the pipeline, said apparatus including a tubular structure (21) and an ultraviolet lamp (11) positioned within said tubular structure, said tubular structure including a sheet-like material (20) having a sheet material (22) including an ultraviolet-curing resin and high-strength fibers, and having a pair of longitudinal edge portions (20', 20") slidably overlapping each other,
    expanding said tubular structure (21) to cause said overlapping portions to slide on each other and to bring it into intimate contact with the inner surface of the pipeline (7), and
    irradiating said tubular structure (21) with ultraviolet light from the ultraviolet lamp (11) to cure said resin in the sheet material (22).

2. The method according to claim 1 wherein said apparatus further includes at least two sealing members (24, 24') capable of swelling with water provided in spaced apart relationship on an outer surface of said tubular structure (21) and said step of inserting includes bracketing the damaged part (26) of the pipeline (7) between the sealing members (24, 24').

3. The method according to claim 1 wherein said tubular structure further includes a sealed inflatable tube (19) disposed within said sheetlike material (20), said inflatable tube being composed of a material transmissive to ultraviolet light, and the step of expanding said tubular structure (21) includes expanding said sealed inflatable tube (19) by fluid pressure.

4. The method according to claim 2 wherein said tubular structure further includes a sealed inflatable tube (19) disposed within said sheetlike material (20), said inflatable tube being composed of a material transmissive to ultraviolet light, and the step of expanding said tubular structure includes expanding said sealed inflatable tube (19).

5. An apparatus for repairing a damaged part of a pipeline comprising a tubular member (3) transmissive of ultraviolet light, supporting members (1, 2) attached to both ends of said tubular member (3) for supporting said tubular member (3) within the pipeline (7), while being movable along the pipeline, mounts (10) for a repairing assembly (9) having a tubular structure (21) including an inflatable tube (19) disposed within said tubular structure (21), said mounts (10) being provided around both ends of said tubular member (3) for mounting both ends of said inflatable tube (19) fitted around said tubular member (3), pressurizing means (15) for supplying a pressurized fluid into the sealed space formed between said tubular member (3) and said inflatable tube (19) and an ultraviolet lamp (11) disposed within said tubular member (3).

6. The apparatus according to claim 5 further comprising a fan (14) for supplying air into said tubular member (3) to cool said ultraviolet lamp (11).

7. The apparatus according to claim 5 further comprising a tubular wire netting layer disposed over an outer surface of said tubular member (3) and within said inflatable tube (19).

8. The apparatus according to claim 6 further comprising a tubular wire netting layer disposed over an outer surface of said tubular member (3) and within said inflatable tube (19).

9. An assembly for repairing a pipeline comprising a tubular structure (21) including an inflatable tube (19) and a sheetlike material (20) wound about said inflatable tube (19), said sheetlike material (20) having a pair of longitudinal edge portions (20', 20") slidably overlapping each other, said sheetlike material (20) having a sheet material (22) which is prepared from a thickened solution of an ultraviolet-curing resin in which high-strength fibers are dispersed, said sheetlike material (20) being in length from one edge portion (20') to the other edge portion (20") larger than the inner peripheral length of the pipeline.

10. An assembly for repairing a pipeline comprising a flexible inflatable tube (19) transmissive of ultraviolet light, and a tubular structure (21) formed by a sheetlike material (20) wound about said inflatable tube (19) and having a pair of longitudinal edge portions (20', 20") of the sheetlike material (20) slidably overlapping each other, said sheetlike material (20) having a sheet material (22) which is prepared from a thickened solution of an ultraviolet-curing resin in which high-strength fibers are dispersed, said sheetlike material (20) being in the length from one edge portion (20') to the other edge portion (20") larger than the inner peripheral length of the pipeline.

11. The assembly according to claim 9, further comprising at least two annular sealing members (24, 24') fitted to an outer surface of said tubular structure (21) at least one of said at least two annular sealing members being adjacent to each end thereof, said sealing members being of a material which swells by absorbing water.

12. The assembly according to claim 10, further comprising at least two annular sealing members (24, 24') fitted to an outer surface of said tubular structure (21) at least one of said at least two annular sealing members being adjacent to both ends thereof, said sealing members being of a material which swells by absorbing water.

13. The assembly according to claim 9, wherein the sheetlike material (20) further comprises at least one thin meshed woven fabric layer (23) overlapped on and/or below the sheet material (22).

14. The assembly according to claim 10, wherein the sheetlike material (20) further comprises at least one thin meshed woven fabric layer (23) overlapped on and/or below the sheet material (22).

15. The assembly according to claim 11, wherein the sheetlike material (20) further comprises at least one thin meshed woven fabric layer (23) overlapped on and/or below the sheet material (22).

16. The assembly according to claim 12, wherein the sheetlike material (20) further comprises at least one thin meshed woven fabric layer (23) overlapped on and/or below the sheet material (22).

* * * * *